July 21, 1964 A. K. CHITAYAT 3,141,978
SATELLITE TRACKING MEANS
Filed May 4, 1961 5 Sheets-Sheet 1
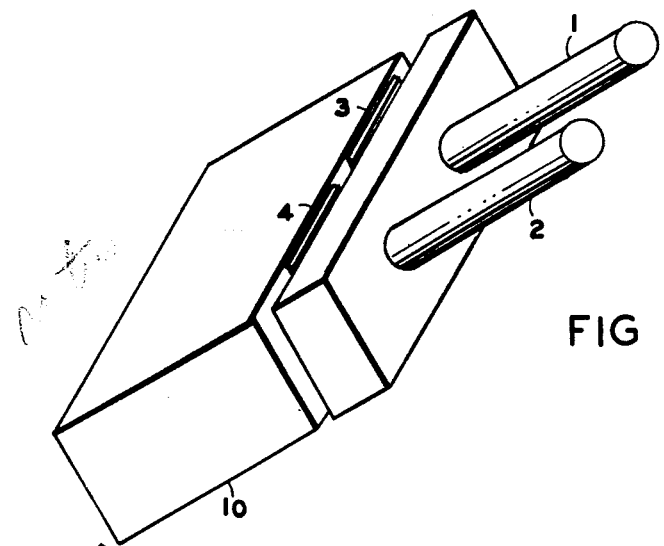
FIG 1
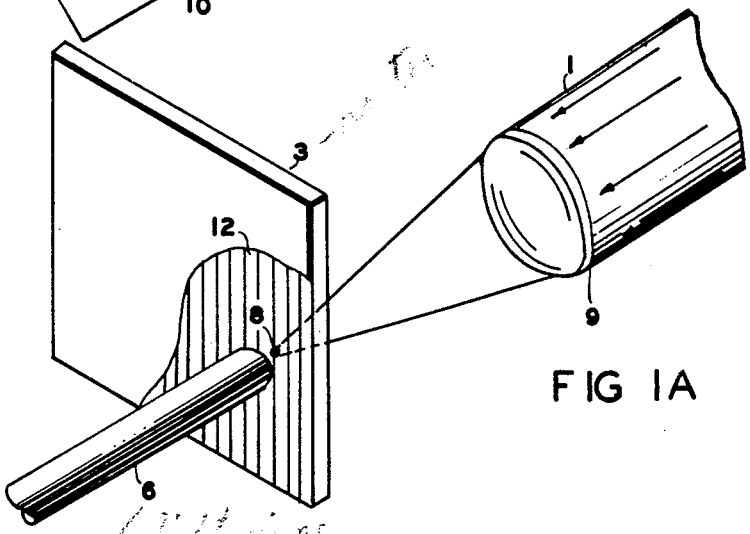
FIG 1A
FIG 6
INVENTOR.
ANWAR CHITAYAT
BY James P. Malone

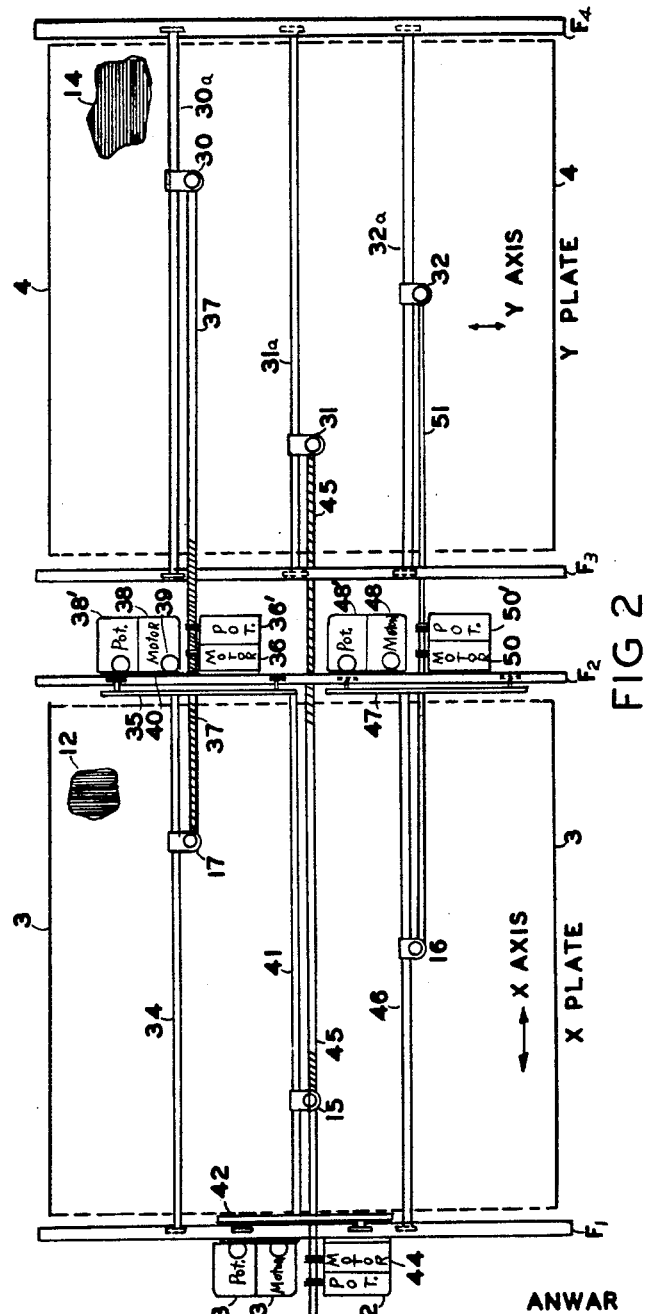

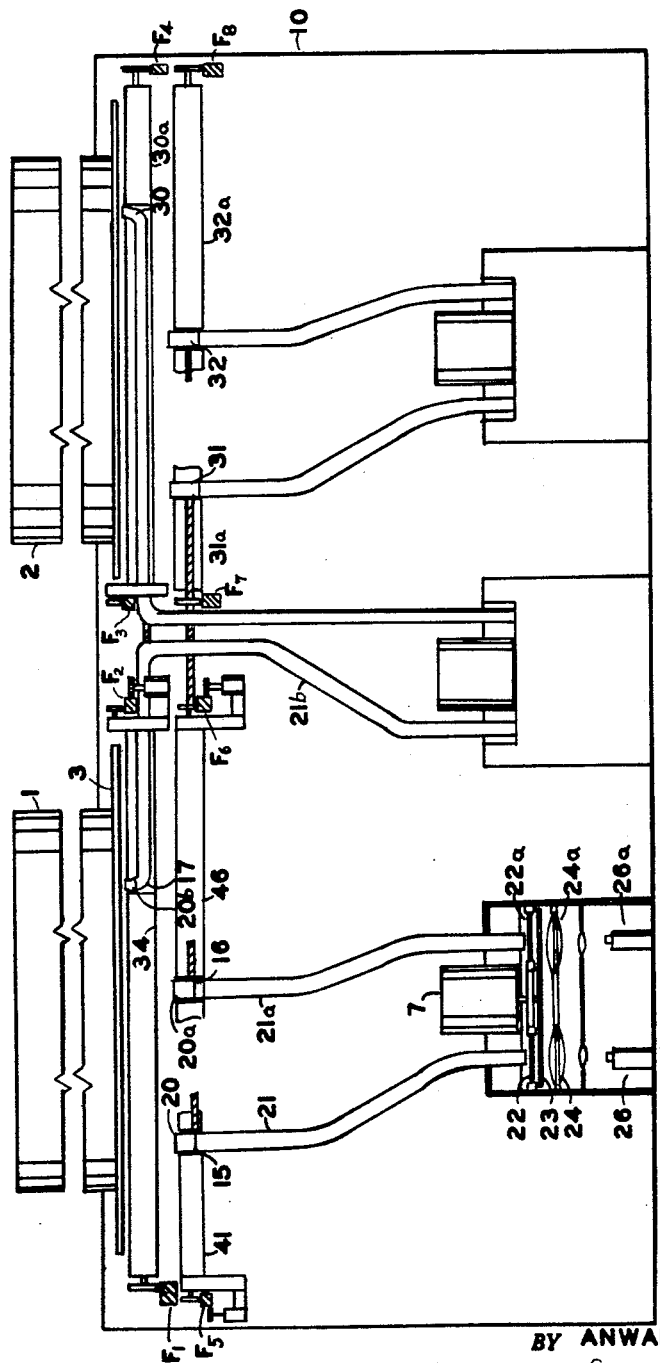

July 21, 1964     A. K. CHITAYAT     3,141,978
SATELLITE TRACKING MEANS

Filed May 4, 1961     5 Sheets-Sheet 4

INVENTOR.
ANWAR CHITAYAT
BY James O. Malone

# United States Patent Office 3,141,978
Patented July 21, 1964

3,141,978
SATELLITE TRACKING MEANS
Anwar K. Chitayat, Plainview, N.Y., assignor to Optomechanisms, Inc., Mineola, N.Y.
Filed May 4, 1961, Ser. No. 107,778
3 Claims. (Cl. 250—203)

This invention relates to satellite tracking and measuring means and more particularly to means for measuring the angle between a satellite and a star.

The present invention provides for the measurement of the angle between a satellite and star to within an accuracy of one second of arc.

It would be difficult, if not impossible, to design a mechanical system that automatically follows a satellite and measure its position by measuring the angular displacement of the telescope. The reason for this difficulty is evident when it is noted that a mechanical deflection of 0.00005" in a radius of 10" represents an error of one second. Consequently, a highly expensive system would have to be devised to keep deflections to lower than one micron. Another difficulty arises due to the extremely short time that a satellite traverses one second of arc (which may be less than 100 microseconds); this obviously requires an extremely fast servo followup.

The approach of the present invention is radically different from a mechanical tracking system. The angular measurement is achieved by direct measurement of the angle between a known star and the satellite. The measuring device is a raster, containing a large number of alternately opaque and transparent lines, representing grid coordinates.

The satellite's image is focused on the raster. Consequently, a relative movement between the satellite and telescope causes the image to move relative to the raster lines, presenting one signal per line which are counted. Each line equals two seconds of arc.

Separate photoelectric detectors are provided to determine the signal of the satellite and two preselected stars. Angular measurement is achieved by comparing the counted angular displacement of the stars and satellite.

The field of view of the raster and optics is large (in the order of 30°). But the field of view of each detector is small (in the order of 4′–2°). The measuring accuracy of the system is dependent only on the raster and objective lens. The detecting system contributes no errors, provided that it detects the imaged light passing through the raster. Consequently, the scanning and detection system may track the satellite in order to keep it within the field of view. Thus, it is contemplated that the tracking accuracy of each detecting system is only 2 minutes of arc which is relatively easy to achieve.

The full system contains two rasters and two objective lenses in order to obtain the angular measurements in two coordinates.

Accordingly, a principal object of the invention is to provide new and improved satellite tracking and measuring means.

Another object of the invention is to provide new and improved optical means to measure the angle between a satellite and a star.

Another object of the invention is to provide new and improved optical means to measure the angle between a satellite and a star with an accuracy of approximately one second of angle.

Another object of the invention is to provide new and improved optical means for tracking a satellite comprising optical scanning and detection means to measure the angle between the satellite and a star.

Another object of the invention is to provide new and improved satellite tracking and measuring means, using optical grating means.

Another object of the invention is to provide new and improved optical grating means and counting means to measure the angle between a satellite and a star.

Another object of the invention is to provide new and improved optical means to measure the angle between a satellite and a star with an accuracy of approximately one second of angle by counting the signals generated by satellite or star images passing raster lines on an optical grating.

Another object of the invention is to provide new and improved optical means for tracking and measuring position of a satellite comprising optical scanning and detection means to measure the angle between the satellite and a star.

These and other objects of the invention will be apparent from the following specification and drawings, of which FIG. 1 is a perspective view illustrative of an embodiment of the invention.

FIG. 1A is a diagram illustrative of the operation of the invention.

FIG. 2 is a plan view of an embodiment of the invention.

FIG. 2A is an elevation view of an embodiment of the invention.

FIG. 6 is a diagram illustrative of the operation of the invention.

Figure 5:
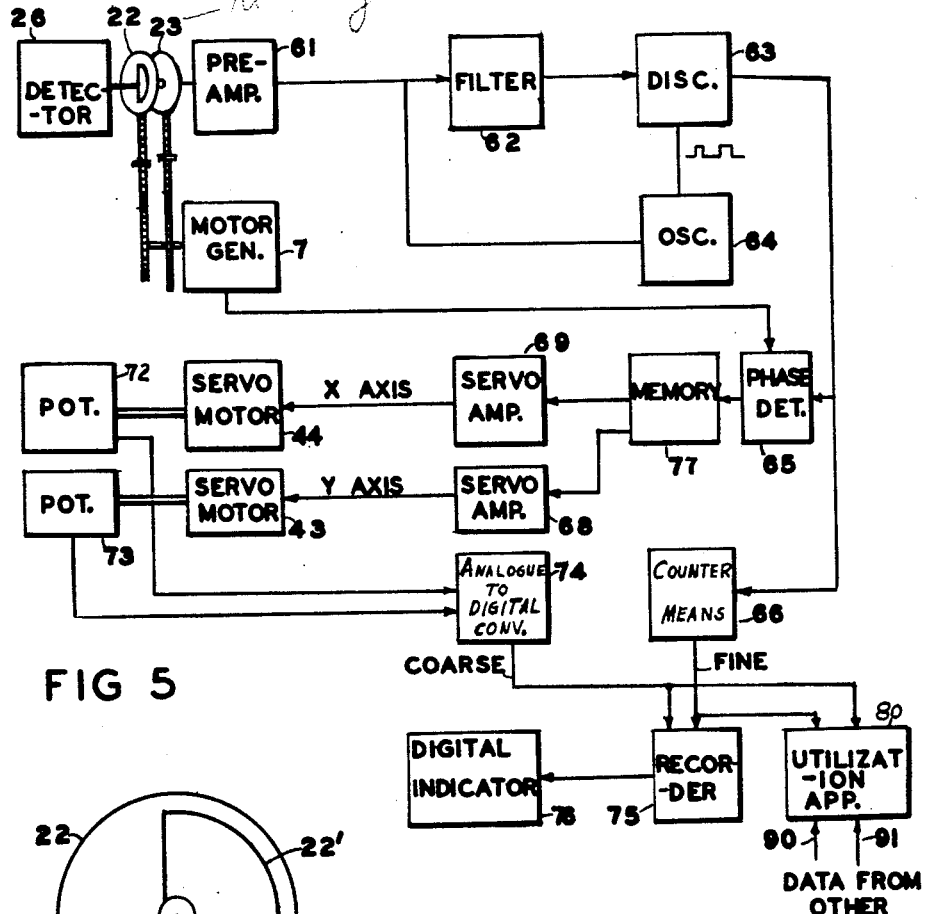
FIG. 5 is a schematic block diagram of the control means of the invention.

Referring to the figures, FIGS. 1 and 1A illustrate an embodiment of the invention. FIG. 1 shows telescope means 1 for measurement along a first X axis and second telescope means 2 for measurement along a second Y axis. Each telescope means comprises suitable objective lenses 9 for focusing star and satellite images on an X axis raster 3 and a Y axis raster 4. Each raster contains a large number of parallel lines so that as the image 8 moves past the lines 12, signals are generated and transmitted through a fiberoptic cable 6 to suitable detection means which are included in the rear frame 10.

The objective lenses and rasters chosen are similar to those used for ballistic plate photography (satellite plate cameras). The lens 9 chosen may be of 15" focal length f/2.5 in order to obtain a 30° field of view. The resolution of the optics are such that the circle of confusion is not to exceed 2 seconds of arc. Such a resolution has been surpassed by ballistic plate cameras. It may be noted that specific requirements may necessitate optics with larger focal lengths and smaller field of view. This does not change the overall system configuration.

The rasters 3 and 4 described here contain lines that have an equivalent width of 2 seconds of arc. The method of manufacture is achieved in one of the following alternate methods:

(1) Lines of approximately .0003" apart are ruled on a highly stable glass plate. Since gratings are made to a much closer spacing than the above, this method is certainly feasible.

(2) A photograph is taken with a photographically sensitized glass plate, of lines which correspond to the angular spacing required. These lines may be produced by an illuminated target containing the dimensions of one line which is moved accurately in 4-second steps. The target is put in one position and the illuminated for a predetermined period. It is then moved to another spot and illuminated again. The target must be located at a large distance from the system in order to obtain a high resolution image. This photography must be done at night in order not expose the image by background illumination.

(3) A special collimator is made in order to photograph lines on the ballistic plate.

In the second and third approaches described above, the lens which corresponds to the raster must be used for photographing its photosensitive plate. Consequently, any distortions due to the lens system are compensated for, by the use of the glass plate. Thus, it is not necessary to compensate for distortion errors of the lens, when these two approaches are chosen.

Figure 2B:
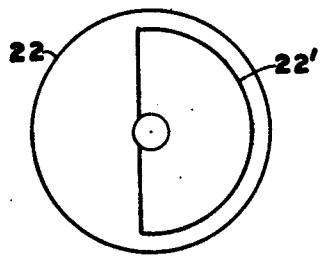
FIG. 2B is a detail view of the modulating disc.

FIGS. 2 and 2A show plan and elevation views of the tracking means. There are two raster plates, an X axis plate 3 completely covered with lines 12 in one direction, and a Y axis plate 4 having the raster lines 14 at 90° to the lines 12. As shown in FIG. 1A the raster plates are at the focus of the objective lenses so that the images of the star and satellite are focused on the raster plates. Mounted behind the plate are the optical pickups for one or more stars and satellites, for instance the pickup 15 for star No. 1, pickup 16 for star No. 2 and pickup 17 for the satellite, all of these being behind the X axis plate 3. Each pickup may include a lens 20, 20a and 20b and fiberoptic cables 21, 21a and 21b connected thereto. The fiberoptic cables feed the light signals past separately driven modulating discs 22, 22a. There is one modulating disc for each cable. The modulating discs are illustrated in FIG. 2B. The disc 22 has a semicircular aperture 22', which supplies a direction sensitive modulation for tracking control as will be explained.

It may be observed, that if the image of the satellite or star is not in the center of the axis of rotation (optical axis), its signal will be modulated by the disc 22. The phase of this modulation determines the tracking error (up, down, right or left). A motor-generator resolver 7 of FIG. 5 is geared directly to the disc drive in order to provide a reference for the measurement of angular phase of the tracking error. The operation of the tracking error detector is further explained in the electronic block diagram (FIG. 5).

The signals then pass through a rotating disc raster 23, FIG. 4, connected to motor-generator 7 which modulates the signal for noise rejection as will be explained. The signals shown in FIG. 6 are then collected by the lenses 24, 24a, from which they are picked up by the phototube counters 26, 26a.

The satellite pickup 17 is similar to the star pickups 15 and 16 except it is mounted in a different vertical plane so that it may cross over the star pickups in the event that the satellite crosses over the star which is being used as a reference. In order to permit this cross-over the satellite pick cable 21b is longer than the star cables and has a horizontal portion. The remaining elements of the satellite pickup system are the same as previously described comprising a scanning disc and modulating disc, pickup lenses and phototube.

The Y axis pickup heads comprising the satellite pickup 30 and the star pickups 31 and 32 and their associated elements are the same as previously described including the fiber cables, scanning discs, modulation discs, lens systems and phototubes.

Figure 3:
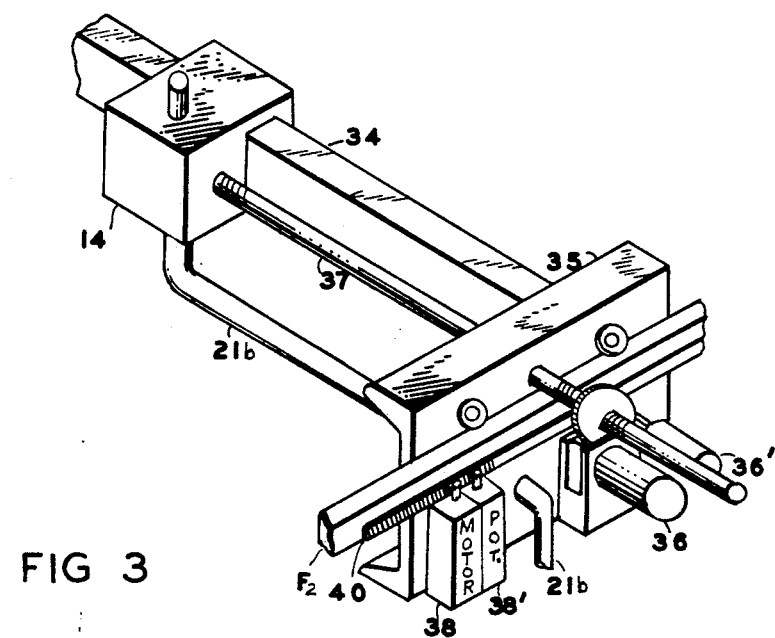
FIG. 3 is a perspective detail view of an embodiment of the invention.

Referring to FIGS. 2, 2A and 3, FIG. 2 shows a plan view of the tracking heads, all of which are mounted on frame members $F_1$ to $F_8$. The satellite pickup head 17 is slidably mounted on a support rail 34 mounted on carriage 35 which is movably mounted on the frame member $F_2$. The other end of rail 34 is wheel mounted on frame $F_1$. The carriage 35 and tracking head 17 are propelled along the X axis by the X axis servo motor 36 on carriage 35 which is geared to a long lead screw 37. The Y axis drive for the head 17 is provided by the servo motor 38 on carriage 35 which is geared by means of the gear 39 to a stationary rack 40 which is mounted on frame $F_2$.

Potentiometers 38' and 36' transmit the X and Y positions.

The tracking head 15 for star No. 1 is similarly mounted on a rail 41 which is mounted on a movable carriage 42 mounted on the frame $F_5$ and which is driven along the Y axis by the servo motor 43 mounted on carriage 42. The X axis motion for the head 15 is provided by the servo motor 44 which is geared to a long lead screw 45 similar to that previously described. Potentiometers 72 and 73 transmit the X and Y positions.

The tracking head 16 for star No. 2 is similarly mounted on a support rail 46 which is mounted on a movable carriage 47 on frame member $F_6$ similar to those previously described which is driven by the Y axis servo motor 48. The X axis drive for the head 16 is provided by the motor 50 and the lead screw 51 similar to that previously described. Potentiometers 50' and 48' transmit the X and Y positions.

The Y axis pickups are similarly mounted. The satellite pickup 30 is mounted on a rail 30a and operated by the same lead screw 37 as previously described. The rail 30a is movably mounted on wheels on frame members $F_3$–$F_4$ and moved relative the rack 40, by servo motor 38, through rigid lead screw 37.

The Y axis tracking head 31 for star No. 1 is similarly mounted on a support bar 31a and operated by the lead screw 45 which also operates the X axis head 15. The bar 31a is movably mounted on frame members $F_7$, $F_8$ and connected to carriage 42, by lead screw 45.

The Y axis tracking head 32 for star No. 2 is similarly mounted on a bar 32a and operated by the lead screw 51 and carriage 47.

It may be desired to provide for the condition when the satellite's axis crosses the star axis, and the tracking information from one star is lost for a very short time due to the high speed of the satellite. Thus, for a star's field of view of ½° and satellite's velocity of 30°/min., the maximum time for loss of tracking of one star is one second. During this time, an automatic rate memory circuit 75 FIG. 5 which may be a conventional magnetic memory means advances the star information at the same rate prior to the loss of tracking. Actually, during one second of time, the maximum movement of a star possible is fifteen seconds of arc. Consequently, it is necessary to know the star velocity with an accuracy of $$\frac{\text{one second}}{15 \text{ seconds}} = 6\%$$

to achieve an accuracy of one second of arc. However, the circuits that achieve the memory of star velocity would have an accuracy better than 1%, and consequently, the error caused by the loss of tracking for a star is much less than one second of arc and can be considered negligible. There is no crossover of stars.

Figure 4:
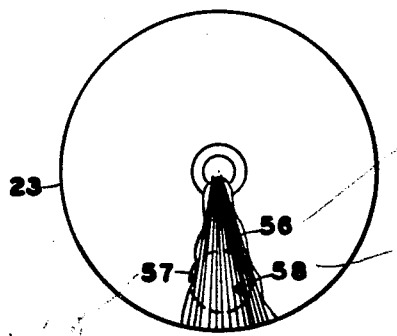
FIG. 4 is a detail view illustrative of the rotating raster.

FIG. 4 shows a detail view of the rotating raster 23 which has a plurality of radial lines 56. The circle 57 indicates the field of view and the satellite image is indicated at 58.

In order to achieve a high signal to noise ratio, the effects of the background sky must be minimized. It is then necessary to distinguish between point objects and background illumination. This is achieved by the raster 23 since point sources are modulated by the raster with a relatively high frequency, for instance 4,000 c.p.s., while almost all background illumination presents little or no signal containing the carrier frequency. An electronic filter 62 FIG. 5 tuned to 4,000 c.p.s. therefore rejects background noise and pickup.

FIG. 5 shows a schematic block diagram of the tracking control means for either the satellite or star pickup heads.

The modulation of the satellite and star signals by the highly precise rasters 3 and 4 develops the satellite signal 81 and typical star signal 80 shown in FIG. 6. The satellite travels much faster than the star.

The repetitive rate of occurrence of the star signals 80 and satellite signals 81 is quite uniform, since the velocities do not change abruptly. Consequently, electronic correlation techniques can be used to prevent any noise signals from interfering with the accurate counting of the raster lines. The electronic correlation is done in the following manner as illustrated by FIG. 5:

A synchronized multivibrator oscillator 64 is first synchronized so that it is approximately at the same frequency as the expected rate of satellite's or star travel. Then, as soon as a signal is observed from the satellite, it will synchronize the multivibrator, so that it is in phase. The output of the oscillator is then used to "gate" the output signals from the detector. This gate allows only the passage of signals in phase with the multivibrator, but will not allow the passage of other "random" noise pulses. Consequently, if a star slowly enters the field of view of the satellite's detector, its signal is prevented from disturbing the precise angular counting of the satellite's position.

In addition to the automatic correlation, the electronic amplifiers are preferably limited in frequency response, such that only those frequencies within the bandwidth of the expected signals are passed. Thus, for satellite tracking, low frequencies of the starts are rejected and vice versa.

More specifically, a signal is received by one of the photo detector means, for instance 26, where it is modulated by the discs 22 and 23 and fed to the preamplifier 61. The signal is then connected to the filter 62 which may be tuned to 4000 c.p.s. to detect the modulation of the disc 23. The filter 62 therefore operates a discriminate against background noise.

The signal is then fed to the correlation discriminator or gate 63 which is gated by square waves from the multivibrator 64 which is synchronized by the signal from the preamplifier 61.

The output of the discriminator 63 is then fed to the phase detector 65 where its phase is compared with the reference voltage from the resolver motor generator 7 which is connected to the shaft of the modulating disc 22. The X axis error signal is then fed to the servo amplifier 69 and the Y axis error signal is fed to the Y axis servo amplifier 68. The Y servo amplifier 68 controls the servo motor 43 which is connected to control the particular pickup. The X axis signal is fed to the servo motor 44. The shaft positions of the pickup in the X and Y axes are fed out by means of synchro-generators or potentiometers 72 and 73. There are separate tracking means for the satellite and each star.

The tracking systems may be conventional, for instance of the type used in radar systems. The information from transmitters 72 and 73 may be converted to digital information in converter 74 and this information indicates the pickup position in an approximate or coarse form.

To obtain the fine measurement information, the signal from the discriminator 63 is also fed to counter circuits 66. The coarse data is sufficient to resolve any ambiguities in the fine data. The coarse and fine information may then be utilized in various ways, for instance in a recorder 75, digital indicator 76, other utilization apparatus 80. This utilization apparatus may take the form of counting or computing apparatus to compare the readings of the detector 26 with the readings from another detector, for instance satellite detector 26b on leads 90, 91 to determine the angle of the satellite with reference to the star.

In the event that the satellite passes over a star, the star information may be momentarily lost. To cover this contingency a memory rate circuit 77 may be inserted in the control means for the star pickup to continue the rate of star travel until the star signal is resumed. The memory means may be a conventional magnetic drum memory device.

Many modifications may be made by those who desire to practice the invention without departing from the scope thereof which is defined by the following claims:

I claim:

1. Satellite tracking and measuring means comprising first optical means to track a star, second optical means to track a satellite, first coarse measuring means connected to said first and second tracking means to measure the angle between said star and said satellite, and second fine optical measuring means connected to said first and second optical means to measure the angle between said star and said satellite including an optical grating.

2. Satellite tracking and measuring means comprising first optical means to track a star, second optical means to track a satellite, first coarse measuring means connected to said first and second tracking means, and second fine measuring means connected to said first and second optical means to measure the angle between said star and said satellite including an optical grating, movable pickup means behind said grating, and counter means connected to said pickup means.

3. Satellite tracking means comprising a stationary optical raster, telescope means to receive a light signal from a satellite and focus on said raster, movable pickup means behind said stationary raster to pick up said signal, counter means connected to said pickup means to count said lines crossed by said signals, and coarse means to track said pickup means, comprising means to modulate said signal, means to compare the phase of said modulated signal with a reference voltage, and servo motor means responsive to said phase measuring means to move said pickup means.

References Cited in the file of this patent

UNITED STATES PATENTS

| | | |
|---|---|---|
| 2,905,828 | O'Maley et al. | Sept. 22, 1959 |
| 2,941,080 | Hansen | June 14, 1960 |
| 2,997,699 | Lovell | Aug. 22, 1961 |